US012519213B2

(12) United States Patent
Kum et al.

(10) Patent No.: US 12,519,213 B2
(45) Date of Patent: Jan. 6, 2026

(54) ANTENNA MODULE AND ELECTRONIC DEVICE INCLUDING THE SAME

(71) Applicant: Samsung Electronics Co., Ltd., Suwon-si (KR)

(72) Inventors: Junsig Kum, Suwon-si (KR); Yoongeon Kim, Suwon-si (KR); Seokmin Lee, Suwon-si (KR); Seungho Choi, Suwon-si (KR); Youngju Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 166 days.

(21) Appl. No.: 18/184,207

(22) Filed: Mar. 15, 2023

(65) Prior Publication Data

US 2023/0216179 A1 Jul. 6, 2023

Related U.S. Application Data

(63) Continuation of application No. PCT/KR2022/003852, filed on Mar. 18, 2022.

(30) Foreign Application Priority Data

Mar. 19, 2021 (KR) ........................ 10-2021-0036236

(51) Int. Cl.
*H01Q 1/24* (2006.01)
*H01Q 21/06* (2006.01)

(52) U.S. Cl.
CPC ........... *H01Q 1/246* (2013.01); *H01Q 21/065* (2013.01)

(58) Field of Classification Search
None
See application file for complete search history.

(56) References Cited

U.S. PATENT DOCUMENTS 5,510,803 A 4/1996 Ishizaka et al.
6,211,824 B1 * 4/2001 Holden ................ H01Q 9/0414 343/846

(Continued)

FOREIGN PATENT DOCUMENTS

CN 107565225 A 1/2018
CN 108598690 A 9/2018

(Continued)

OTHER PUBLICATIONS

Relative Permittivity—the Dielectric Constant, Captured by Wayback Machine on Dec. 4, 2020, The Engineering Toolbox Website https://www.engineeringtoolbox.com/relative-permittivity-d_1660.html (Year: 2020).*

(Continued)

*Primary Examiner* — Dameon E Levi
*Assistant Examiner* — Anh N Ho
(74) *Attorney, Agent, or Firm* — Jefferson IP Law, LLP

(57) ABSTRACT

The disclosure relates to a pre-5$^{th}$-Generation (5G) or 5G communication system to be provided for supporting higher data rates Beyond 4$^{th}$-Generation (4G) communication system such as Long Term Evolution (LTE). An antenna module is provided. The antenna module includes multiple antennas, a distribution circuit disposed to provide an electrical connection with each of the multiple antennas, a metal plate, and a dielectric substrate disposed between a pattern layer of the distribution circuit and the metal plate, wherein the dielectric substrate includes one or more dielectric film layers and one or more adhesive layers.

18 Claims, 12 Drawing Sheets

(56) References Cited

U.S. PATENT DOCUMENTS

| | | | |
|---|---|---|---|
| 7,460,072 B1 | 12/2008 | Goldberger | |
| 10,965,031 B2 | 3/2021 | Shin et al. | |
| 11,165,155 B2 | 11/2021 | Huh et al. | |
| 11,355,835 B2 | 6/2022 | Park et al. | |
| 2003/0067410 A1 | 4/2003 | Puzella et al. | |
| 2006/0103024 A1* | 5/2006 | Salmon | H05K 1/0271 257/E23.07 |
| 2019/0280363 A1* | 9/2019 | Dahle | H01Q 1/2283 |
| 2020/0379607 A1 | 12/2020 | Oh et al. | |

FOREIGN PATENT DOCUMENTS

| | | | | |
|---|---|---|---|---|
| CN | 110235309 A | * | 9/2019 | B32B 18/00 |
| CN | 110323563 A | * | 10/2019 | H01Q 1/02 |
| JP | H11-186838 A | | 7/1999 | |
| JP | 2001-36332 A | | 2/2001 | |
| KR | 10-0542830 B1 | | 1/2006 | |
| KR | 10-2006-0009816 A | | 2/2006 | |
| KR | 20130055145 A | * | 5/2013 | |
| KR | 10-2019-0043484 A | | 4/2019 | |
| KR | 10-2019-0086275 A | | 7/2019 | |
| KR | 20190086275 A | * | 7/2019 | |
| KR | 10-2031203 B1 | | 10/2019 | |
| KR | 10-2147390 B1 | | 8/2020 | |
| KR | 10-2154313 B1 | | 9/2020 | |
| KR | 10-2021-0001607 A | | 1/2021 | |
| KR | 10-2021-0121410 A | | 10/2021 | |
| WO | WO-2004070878 A1 | * | 8/2004 | H01Q 1/085 |
| WO | WO-2021072032 A1 | * | 4/2021 | H01Q 1/246 |

OTHER PUBLICATIONS

Kapton—Summary of Properties, Dupont website https://www.dupont.com/content/dam/dupont/amer/us/en/ei-transformation/public/documents/en/EI-10142_Kapton-Summary-of-Properties.pdf (Year: 2024).*

Extended European Search Report dated Jun. 11, 2024, issued in European Application No. 22771828.5-1201.

International Search Report dated Jul. 12, 2022, issued in International Patent Application No. PCT/KR2022/003852.

Korean Office Action dated Mar. 2, 2025, issued in a Korean Patent Application No. 10-2021-0036236.

* cited by examiner

ANTENNA MODULE AND ELECTRONIC DEVICE INCLUDING THE SAME

CROSS-REFERENCE TO RELATED APPLICATION(S)

This application is a continuation application, claiming priority under § 365 (c), of an International application No. PCT/KR2022/003852, filed on Mar. 18, 2022, which is based on and claims the benefit of a Korean patent application number 10-2021-0036236, filed on Mar. 19, 2021, in the Korean Intellectual Property Office, the disclosure of which is incorporated by reference herein in its entirety.

TECHNICAL FIELD

The disclosure relates to a wireless communication system. More particularly, the disclosure relates to an antenna module and an electronic device including the same in a wireless communication system.

BACKGROUND ART

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

There has been ongoing development regarding products equipped with multiple antennas in order to improve the communication performance, and equipment having a gradually increasing number of antennas by using massive MIMO technology is expected to be used.

The above information is presented as background information only to assist with an understanding of the disclosure. No determination has been made, and no assertion is made, as to whether any of the above might be applicable as prior art with regard to the disclosure

DISCLOSURE

Technical Problem

Aspects of the disclosure are to address at least the above-mentioned problems and/or disadvantages and to provide at least the advantages described below. Accordingly, an aspect of the disclosure is to provide a stack structure of an antenna module using a dielectric material in a wireless communication system, and an electronic device including the same.

An aspect of the disclosure is to provide a dielectric substrate having a divider pattern disposed thereon for antenna elements in a wireless communication system.

An aspect of the disclosure is to provide a dielectric substrate including one or more dielectric film layers and one or more adhesive layers in a wireless communication system.

Additional aspects will be set forth in part in the description which follows and, in part, will be apparent from the description, or may be learned by practice of the presented embodiments.

Technical Solution

An antenna module according to embodiments of the disclosure may include: multiple antennas, a distribution circuit disposed to provide an electrical connection with each of the multiple antennas, a metal plate, and a dielectric substrate disposed between a pattern layer of the distribution circuit and the metal plate, wherein the dielectric substrate includes one or more dielectric film layers and one or more adhesive layers.

A massive multiple-input multiple-output (MIMO) unit (MMU) device according to embodiments of the disclosure may include: at least one processor; a power supply, a metal plate, and an antenna module, wherein the antenna module includes a distribution circuit which includes a sub-array of an antenna array and is disposed to provide an electrical connection with each of multiple antenna elements of the sub-array, and a dielectric substrate disposed between a pattern layer of the distribution circuit and the metal plate, and the dielectric substrate includes one or more dielectric film layers and one or more adhesive layers.

Advantageous Effects

A device and a method according to various embodiments of the disclosure form a dielectric substrate by using a dielectric film layer and an adhesive material instead of a metal layer as in the case of a printed circuit board (PCB), thereby reducing the cost and weight, and providing high antenna performance.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

In connection with the description of the drawings, same or similar reference numerals will be used to refer to same or similar elements.

MODE FOR INVENTION

Figure 1A:
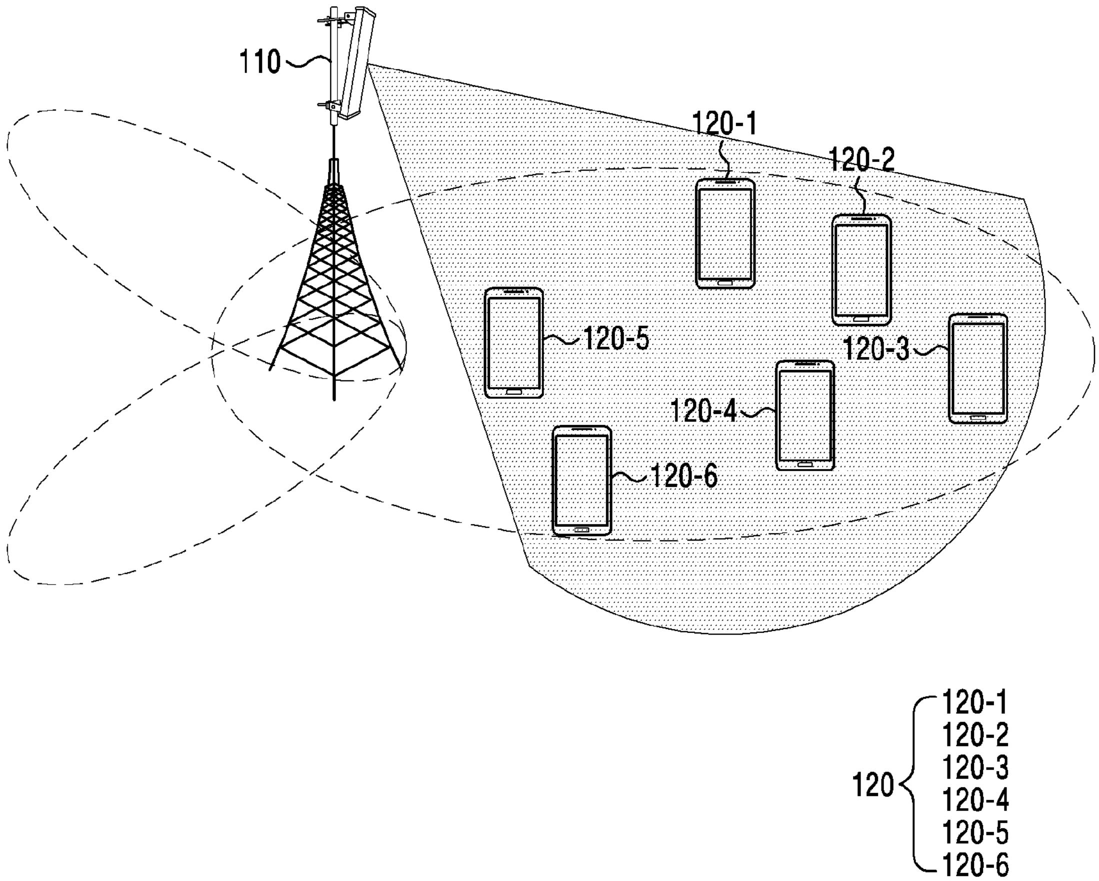
FIG. 1A illustrates a wireless communication system according to embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

Hereinafter, the disclosure relates to an antenna module in a wireless communication system and an electronic device including same. Particularly, the disclosure, in a wireless communication system, describes a technique in which a dielectric substrate is disposed between a pattern layer for supplying power to a radiator and a metal plate for a radio frequency (RF) element to thus lighten a product, lower manufacturing costs, and secure high performance of an antenna through low dielectric loss.

The terms used in the following description, such as a term (e.g., a substrate, a layer, a plate, a film, and a stack) referring to a stack structure of the electronic device, a term (e.g., a print circuit board (PCB) and a flexible PCB (FPCB)) referring to a metal substrate or a metal layer, a term (e.g., a module, an antenna, an antenna device, a circuit, a processor, a chip, an element, and a device) referring to a component, a term (e.g., a structure, a construction, a supporter, a contact part, and a protrusion) referring to the shape of a component, a term (e.g., a connection part, a contact part, a supporter, a contact structure, a conductive member, and an assembly) referring to a connection part between structures, and a term (e.g., a PCB, an FPCB, a signal line, a divider pattern, a feeding line, a data line, an RF signal line, an antenna line, an RF path, an RF module, and an RF circuit) referring to a circuit, may be exemplified for convenience of description. Therefore, the disclosure may not be limited to the terms described later, and other terms with equivalent technical meanings may be used therein. In addition, the terms such as " . . . part", " . . . device", " . . . member", and " . . . body" to be used hereinafter may mean at least one shape structure or a unit for processing a function.

In addition, in the disclosure, various embodiments are described using terms used in some communication standards (e.g., 3rd Generation Partnership Project (3GPP)), but this is only an example for explanation. Various embodiments of the disclosure may be easily modified to be applied to other communication systems.

FIG. 1A illustrates a wireless communication system according to embodiments of the disclosure.

A wireless communication environment of FIG. 1A illustrates, as a part of a node using a wireless channel, a base station 110 and terminals 120-1 to 120-6. A common description for the terminals 120-1 to 120-6 may be described through a terminal 120.

Referring to FIG. 1A, the base station 110 may be a network infrastructure for providing wireless access to the terminals 120-1 to 120-6. The base station 110 may have a coverage defined as a predetermined geographic area, based on a distance allowing a signal to be transmitted. The base station 110 may be referred to as an "access point (AP)", an "eNodeB (eNB)", a "5th generation node", a "5G NodeB (NB)", a "wireless point", a "transmission/reception point (TRP)", an "access unit", a "distributed unit (DU)", a "transmission/reception point (TRP)", a "radio unit (RU)", a "remote radio head (RRH)", or other terms having the equivalent technical meaning, in addition to a base station. The base station 110 may transmit a downlink signal or receive an uplink signal.

The terminals 120-1 to 120-6 may be a device used by a user, and may preform communication with the base station 110 through a wireless channel. In some cases, the terminals 120-1 to 120-6 may be operated without user involvement. That is, the terminals 120-1 to 120-6 may be devices for performing machine-type communication (MTC), and may not be carried by a user. The terminals 120-1 to 120-6 may be referred to as a "user equipment (UE)", a "mobile station", a "subscriber station", a "customer premises device (CPE)", a "remote terminal", a "wireless terminal", an "electronic device", a "vehicle terminal", a "user device", or other terms having the equivalent technical meaning, in addition to a terminal.

As one of the techniques for alleviating propagation path loss and increasing the propagation distance of radio waves, beamforming technology is being used. Generally, beamforming uses multiple antennas to concentrate the arrival area of radio waves, or increase the directivity of reception sensitivity in a specific direction. Therefore, in order to form a beamforming coverage instead of forming a signal in an isotropic pattern by using a single antenna, communication equipment may be provided with multiple antennas. Hereinafter, an antenna array including multiple antennas will be described. The base station 110 or the terminal 120 may include an antenna array. Each antenna included in an antenna array may be referred to as an array element or an antenna element. Hereinafter, in the disclosure, an antenna array may be shown in a two-dimensional planar array, but this may be only an embodiment and may not limit other embodiments of the disclosure. An antenna array may be configured in various forms such as a linear array or a multi-layer array. An antenna array may be referred to as a massive antenna array.

Figure 1B:
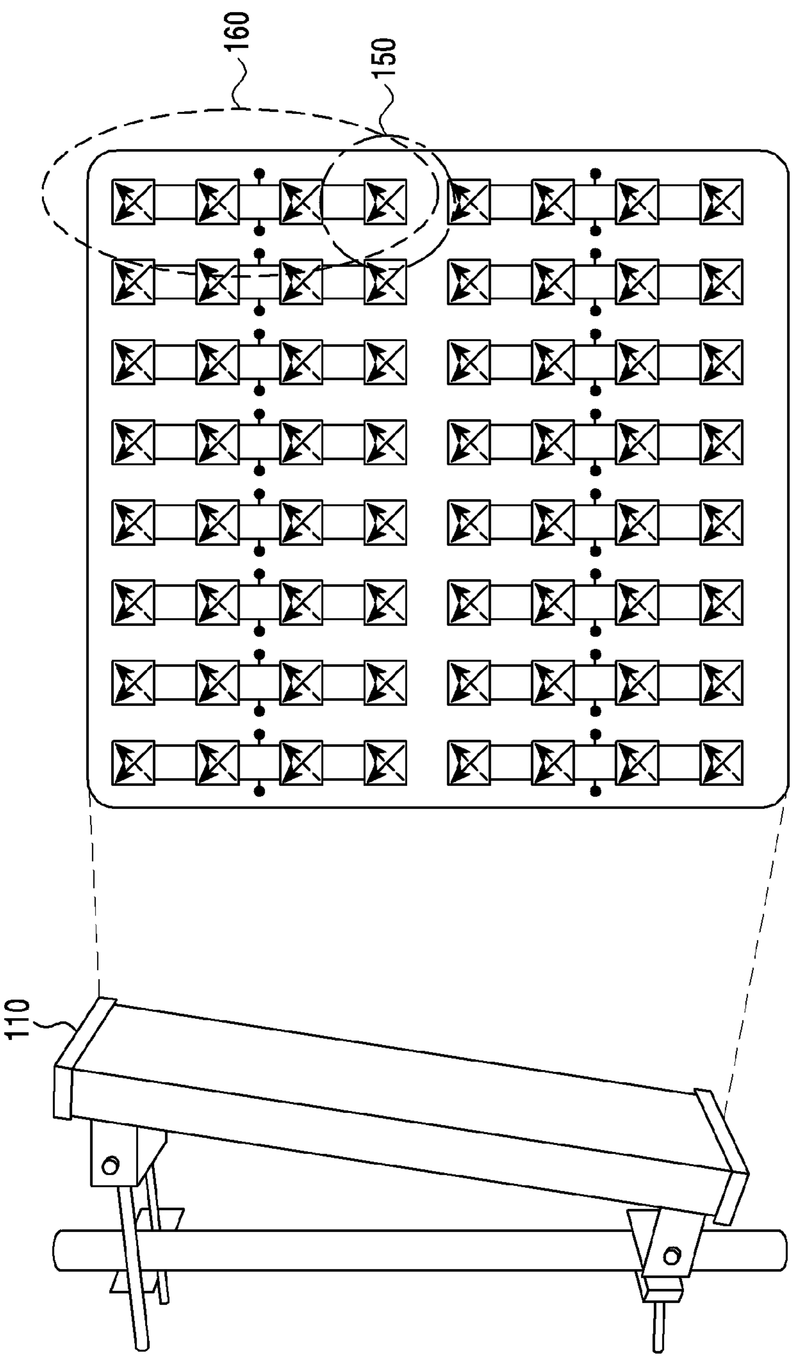
FIG. 1B illustrates an example of a massive multiple-input multiple-output (MIMO) unit (MMU) device according to embodiments of the disclosure.

FIG. 1B illustrates an example of a massive multiple-input multiple-output (MIMO) unit (MMU) device according to an embodiment of the disclosure.

FIG. 1B illustrates an example of an antenna array including a sub-array. FIG. 1B means that an antenna array according to embodiments of the disclosure may be implemented in a sub-array, but does not mean that all embodiments of the disclosure necessarily include a sub-array.

Referring to FIG. 1B, the base station 110 may include multiple antenna elements 150. In order to increase a beamforming gain, a large number of the antenna elements 150 compared to input ports may be used. In order to describe embodiments of the disclosure, a massive multiple-input multiple-output (MIMO) unit (MMU) device including sub-arrays 160 each corresponding to one input port will be described as an example of a beamforming device of the disclosure. It will be described that each sub-array 160 of an MMU device includes the same number of the antenna elements 150, but embodiments of the disclosure may not be limited thereto. According to an embodiment, the number of the antenna elements 150 of some sub-arrays 160 may be different from the number of the antenna elements 150 of other sub-arrays 160.

Referring to FIG. 1B, the sub-array 160 may include the multiple antenna elements 150. Hereinafter, in FIGS. 2A and 2B, although antenna elements arranged in 4×1 form are described as one sub-array 160, this may be only for description of embodiments of the disclosure, and it may not be that the corresponding illustration limits an embodiment of the disclosure. In addition, various embodiments described later may be applied to the sub-array 160 having 2×2 or 3×2 form.

A main technology to improve the data capacity of 5G communication may be a beamforming technology using an antenna array connected to multiple RF paths. For higher data capacity, the number of RF paths should be increased, or power per a RF path should be increased. Increasing a RF path may cause the size increase of a product. In addition, due to spatial restriction when installing actual base station equipment, currently, it is at a level that RF paths cannot be increased any further. In order to increase an antenna gain through high output without increasing the number of RF paths, multiple antenna elements may be connected to RF paths by using a splitter (or a divider) to thus increase an antenna gain. Meanwhile, in order to improve communication performance, the number of components performing wireless communication is increased. Particularly, the number of components such as an antenna and a RF component (e.g., an amplifier and a filter) for processing an RF signal received or transmitted through an antenna is also increased. Therefore, in view of configuring communication equipment, it is essentially required to have lightweight and cost efficiency while satisfying communication performance.

Figure 2A:
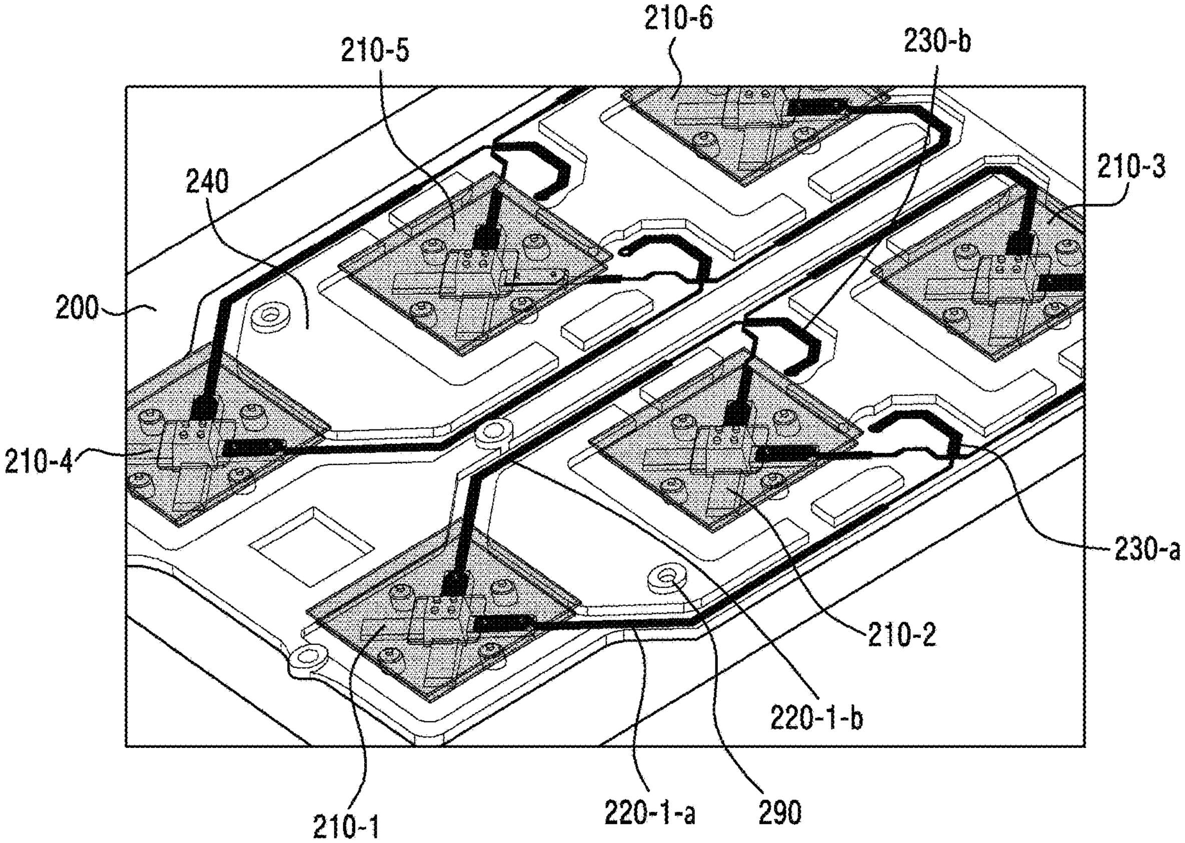
FIGS. 2A and 2B illustrate examples of an antenna unit including a dielectric substrate according to embodiments of the disclosure.
Figure 2B:
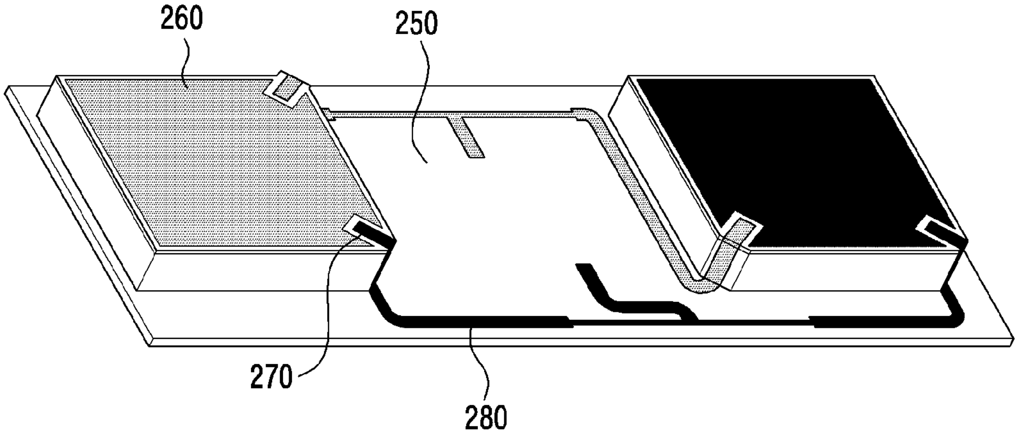

FIGS. 2A and 2B illustrate examples of an antenna unit including a dielectric substrate according to embodiments of the disclosure.

An antenna unit may include a dipole region including a radiator and a pattern region for signal delivery from an RF unit (RU). The dipole region may mean a patch, support, or a feeder. That is, the dipole region may include a radiator and a structure for supporting the radiator. The pattern region may include a distribution circuit configured to deliver a signal delivered from an RU to each antenna element. In order to implement a lightweight trend and low cost according to the increasing number of antenna elements, a substrate made of a dielectric (e.g., plastic) may be used as a substrate for the mounting of an antenna module.

Referring to FIG. 2A, an antenna unit may include an antenna array. The antenna array may be mounted onto the substrate 200. Although FIG. 2A illustrates, as an example, six antenna elements each having 3×1 sub-arrays arranged therein, it is not interpreted that the number of the sub-arrays and the antenna elements limits an embodiment of the disclosure.

The antenna array may include six antenna elements 210-1, 210-2, 210-3, 210-4, 210-5, and 210-6. The antenna array may include two 3×1 sub-arrays. Each antenna element may be configured to be provided with a signal through a feeding circuit from the RF unit. Hereinafter, in connection with the description for each antenna element, the antenna element 210-1 may be described as an example thereof. The description for the antenna element 210-1 may be applied to other antenna elements 210-2, 210-3, 210-4, 210-5, and 210-6 in the same manner.

The antenna element 210-1 may be configured to be provided with a signal from the RF unit through a feeding circuit, or to deliver a signal to the RF unit. The feeding circuit formed on a dielectric substrate 240 may be referred to as a feeding network, a feeding pattern, or a term having the equivalent technical meaning as that. The feeding circuit may correspond to a layer formed on the dielectric substrate 240 in a plating type. The feeding circuit may include a power distributor for distributing a signal to each antenna element and a feeder for providing feeding from each power branch to the antenna element. According to an embodiment, a dual-polarized antenna may be used in order to achieve a spatial gain and cost efficiency while satisfying communication performance. Each antenna element may be configured to receive signals having polarizations different from each other. The feeding circuit may include a power distributor and a feeder for a first polarization (e.g., −45 degrees), and a power distributor and a feeder for a second polarization (e.g., +45 degrees). For example, the 3×1 sub-array may include a power distributor for each polarization.

The antenna element 210-1 may obtain a signal having the first polarization through a first power distributor 230-*a* and a feeder 220-1-*a*. The antenna element 210-1 may obtain a signal having the second polarization through a second power distributor 230-*b* and a feeder 220-1-*b*. Obtaining a signal may mean that a signal delivered through the power distributor is fed to the antenna element through the feeder.

Hereinafter, as an antenna feeding method, although coupling feeding is described as an example, embodiments of the disclosure may not be limited thereto. According to an embodiment, the antenna radiator may be also fed in a method in which the feeder is directly connected to the radiator. The antenna according to embodiments of the disclosure may include the substrate 200 and the dielectric substrate 240 as a substrate on which the feeding circuit is formed. The dielectric substrate 240 may be made of a dielectric having a permittivity. According to an embodiment, the dielectric substrate 240 may be made of a material having a permittivity of 2 [F/m] to 6 [F/m]. The dielectric substrate 240 may be manufactured at low cost compared to an existing printed circuit board (PCB).

The dielectric substrate 240 is coupled to the metal plate (not shown) by a screw or a plastic rivet 290.

Referring to FIG. 2B, the antenna unit may include a 2×1 sub-array. The sub-array illustrated in FIG. 2B may be merely an example for describing the term and the relation of an element, a wire, an apparatus, and it is not be interpreted that the sub-array illustrated in FIG. 2B limits other embodiments of the disclosure. The sub-array may include two antenna elements 260. In the sub-array, each antenna element 260 may be formed higher than a dielectric substrate 250. The antenna module may include a feeder 270 for feeding of the antenna element 260. According to an embodiment, two feeders may deliver a signal to one antenna element in order for a dual polarization. Feeding may be performed in various types. According to an embodiment, the radiator and the feeder 270 of the antenna element 260 may be spaced apart from each other to perform coupling feeding. According to another embodiment, the radiator and the feeder of the antenna element 260 may be in contact with each other to perform direct feeding. A feeding circuit layer for delivering a signal between the feeder and the RF unit may be formed on the dielectric substrate 250. The feeding circuit layer may have a power distributor 280, which is formed on the dielectric substrate 250, for providing power to each feeder. The layer, on which the power distributor is formed, may be referred to as a pattern layer.

As described through FIGS. 2A and 2B, a low-loss dielectric may be used as a substrate for supporting the radiator to thus achieve performance improvement thereof and reduce the manufacturing cost thereof. In order to lower the weight thereof and improve the performance thereof, embodiments of the disclosure may propose a stack structure (hereinafter, a dielectric film-based stack structure) using a dielectric film layer which is further thinner than the dielectric substrate.

Figure 3:
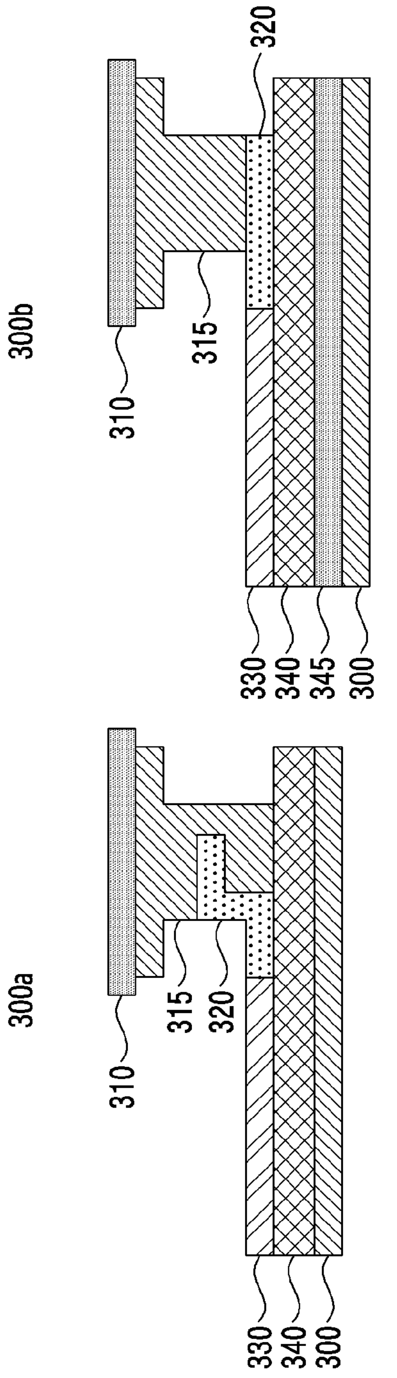
FIG. 3 illustrates an example of a cross section of an antenna module having a dielectric film-based stack structure in a wireless communication system according to embodiments of the disclosure.

FIG. 3 illustrates an example of a cross section of an antenna module having a dielectric film-based stack structure in a wireless communication system according to embodiments of the disclosure.

A dielectric means a material that has almost never free charges and consists of bound charges. According to an embodiment, a dielectric may include a plastic (or a synthetic resin). Hereinafter, although a plastic as a dielectric is described as an example, other dielectrics such as rubber, glass, or polyethylene may be also used for the dielectric substrate of the disclosure. Dielectric loss means power loss in which an alternating electric field (or an electromagnetic wave) undergoes in a dielectric. As the thickness of a dielectric substrate becomes thinner, the dielectric loss thereof can be reduced. The reduced dielectric loss may provide performance improvement thereof. The disclosure may propose a dielectric film layer (e.g., a substrate formed to have a thickness of about 100 micrometer (μm) or less), as a thin dielectric layer.

Referring to FIG. 3, a cross section 300*a* may illustrate a stack structure including a dielectric film layer.

A radiator 310, a radiator supporter 315, a feeder 320, a power distributor 330, and dielectric film layer 340 may be arranged on one surface of a metal plate 300. The dielectric film layer 340 may be stacked on one surface of the metal plate 300. A signal may be delivered from the RU to the radiator through the thin dielectric film layer 340, and thus the performance thereof can be improved due to low dielectric loss.

The power distributor 330 may be positioned on the dielectric film layer 340. Although the cross section 300*a* illustrates a stack structure between one radiator (that is, an antenna element) and the metal plate 300, a signal, which is actually delivered through the metal plate 300, should be distributed to not only the one radiator but also the sub-array or each antenna element of the antenna array. Therefore, the power distributor may be included therein. The power distributor 330 may be formed on the dielectric film layer 340 in a predetermined pattern, and thus the layer of the power distributor 330 may be referred to as a pattern layer.

The feeder 320 may be formed in a three-dimensional shape. The feeder 320 may be connected to the power distributor 330 on the pattern layer. The feeder 320 may deliver a signal received from the power distributor 330 to the radiator 310. Although coupling feeding is illustrated in FIG. 3, the radiator 310 and the feeder 320 may be directly connected to perform direct feeding as well. Meanwhile, the feeder, as the cross section 300*b*, may be formed in a two-dimensional shape. That is, the feeder may be formed on one surface of the dielectric film layer 340. A change of the shape of the feeder may be identically or similarly applied to a cross section 300*b* described later.

The cross section 300*b* may illustrate a stack structure including the dielectric film layer 340 and an adhesive layer 345. For manufacturing and producing, the dielectric substrate may need to have a predetermined thickness. In addition, the dielectric may be moveably disposed due to heat or pressure, and thus may need structural robustness. To solve this problem, according to an embodiment, the stack structure may include the adhesive layer 345. The adhesive layer 345 may mean a layer made of an adhesive material. A film structure, which is formed by the dielectric film layer 340 and the adhesive layer 345 stacked with each other, may be referred to as a dielectric film-based stack structure. Hereinafter, although the description for the dielectric film-based stack structure is described, it may be understood that a dielectric substrate, which is consisted of only the dielectric film, is also included in an embodiment of the disclosure. Hereinafter, through FIGS. 4A and 4B, a specific structure of the dielectric film-based stack structure will be described.

Figure 4A:
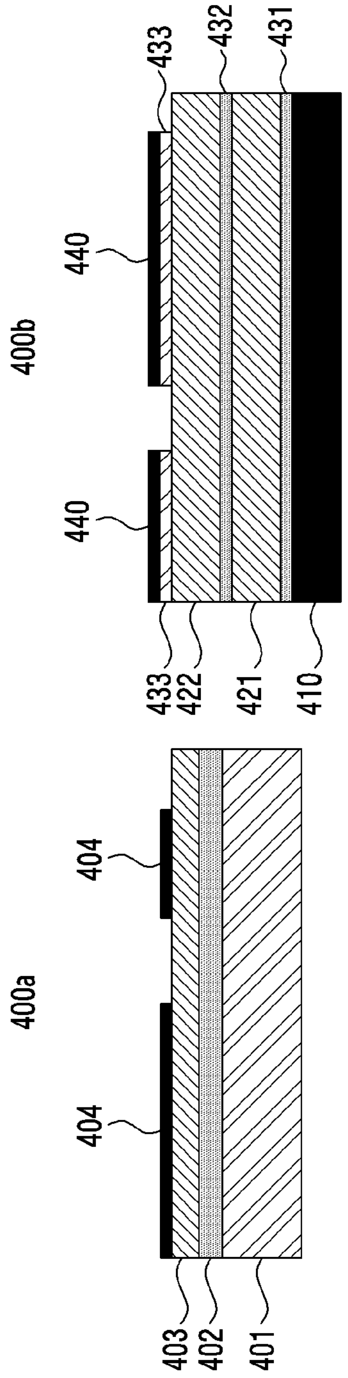
FIGS. 4A and 4B illustrate examples of a dielectric film-based stack structure according to embodiments of the disclosure.
Figure 4B:
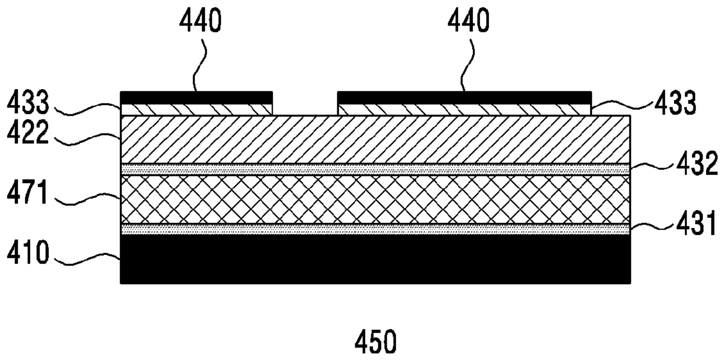

FIGS. 4A and 4B illustrate examples of a dielectric film-based stack structure according to embodiments of the disclosure.

A stack structure of an antenna module is exemplified, and then a stack structure and technical advantage of the dielectric film according to embodiments of the disclosure will be described.

Referring to FIG. 4A, a stack structure 400*a* illustrates a stack structure. A ground layer 402, a printed circuit board (PCB) 403, and a pattern layer 404 may be successively stacked on one surface of a metal substrate 401. A divider pattern formed on the pattern layer 404 may be formed at the time of a PCB manufacturing process. After that, a surface processing (e.g., etching) may be performed at a necessary portion of a pattern layer to form a divider pattern. Since a PCB has a high complexity, it may cost a lot to manufacture. To solve this problem, a dielectric substrate may be used for the stacking of an antenna radiator. Meanwhile, as described above, for low dielectric loss, embodiments of the disclosure may propose a dielectric substrate using a dielectric film.

Referring to FIG. 4B, a stack structure 400*b* illustrates a dielectric film-based stack structure. According to an embodiment, an antenna module may be designed through a periodic structure using the stacking of a dielectric film (e.g., a plastic film). For example, the stack structure 400*b* may include a dielectric substrate by which a first adhesive layer 431, a first dielectric film layer 421, a second adhesive layer 432, and second dielectric film layer 422 are successively stacked on one surface of a metal substrate 410.

The total permittivity of the dielectric substrate may satisfy a predetermined range. For example, the permittivity of the dielectric substrate may have a permittivity of about 2 [F (farad)/m (meter)] to 6 [F/m]. The dielectric substrate may include the dielectric film layer such that the dielectric substrate has low dielectric loss (e.g., less than 0.02). According to an embodiment, the dielectric substrate may include a dielectric film layer having a predetermined thickness (e.g., 100 μm or less). For example, the dielectric film layer may include at least one of a polyimide (PI), liquid crystal polymer (LCP), polyethylene terephthalate (PET), and polycarbonate (PC) films. Although not illustrated in FIG. 4A, according to an embodiment, in order to improve flame retardant property, coating may be performed on the dielectric film. For example, polyethylene may be coated on a plastic film.

According to an embodiment, the dielectric substrate 240 may include an adhesive material for reducing distortion between each film layer, between the film layer and other layer (e.g., the metal substrate 410), or between the pattern layers (i.e., the first power distributor 230-*a* and the second power distributor 230-*b*). The dielectric substrate according to embodiments of the disclosure may need robustness under a high temperature or high pressure in order to replace a metal PCB. The adhesive material may be configured to maintain an attachment at the time of an operation in a high temperature. For example, the adhesive material may include additives (e.g., titanium dioxide, phosphorus-based flame retardant) for improving UV and flame retardant properties. The adhesive may be formed in a form such as a bonding sheet or an adhesive tape.

According to an embodiment, a conductive pattern, that is, a pattern layer 440 for power distribution, may be formed on the dielectric substrate through a third adhesive layer 433. A divider pattern may be formed on the pattern layer 440 by punching (or punching or etching). Punching may mean a material cutting processing such as drawing, piercing, blanking, restriking.

As illustrated in FIG. 4A, in the stack structure, the grounding layer, which is attached onto one surface of the PCB 403, may be removed therefrom. Accordingly, the metal substrate 410 may be used as a ground. In order to be used as a ground, the metal substrate 410 may be formed in a material (e.g., silver, copper, or aluminum) having high conductivity. The dielectric film-based stack structure according to embodiments of the disclosure may be referred to as a metal ground plastic film antenna (MPA) structure. The stack structure of the dielectric substrate including the dielectric film may be referred to as an MPA film structure.

A low cost divider pattern may be manufactured together with the dielectric substrate through the stack structure 400*b* of FIG. 4A. Since a stack structure according to embodiments of the disclosure uses a dielectric substrate, and the dielectric loss thereof may affect the performance thereof. In order to reduce influence due to dielectric loss, dielectrics included in the dielectric substrate may have different kinds to improve antenna radiation efficiency. Hereinafter, an example for implementing a stack structure having low loss will be described through FIG. 4B.

Referring to FIG. 4B, a stack structure 450 may include a dielectric substrate by which a first adhesive layer 431, a first dielectric film layer 421, a second adhesive layer 432, and a heterogeneous dielectric film layer 471 are successively stacked on one surface of the metal substrate 410. The heterogeneous dielectric film layer 471 may mean a substrate formed in a dielectric having a different kind of permittivity from the first dielectric film layer 421. For example, since the total permittivity of the dielectric substrate needs to satisfy 2 to 6 [F/m], the dielectric film layers of the dielectric substrate may have permittivities different from each other. As the loss tangent of a dielectric is higher, a higher loss may occur. The type of dielectric may be designed to have a low loss tangent within the limited permittivity range of the dielectric substrate. The types of dielectrics may be changed to reduce the dielectric loss so that the radiation efficiency of the antenna may be increased. In the stack structure of the antenna module, it may be identified whether the embodiment of the disclosure is carried out by checking dielectric film layers having permittivities different from each other.

A stack structure, on which the divider pattern is formed, is illustrated in FIGS. 4A and 4B. Although not illustrated in the drawings, the antenna module may further include a feeder, a radiator supporter, and a radiator which are connected to each of branches of the divider pattern.

Figure 5:
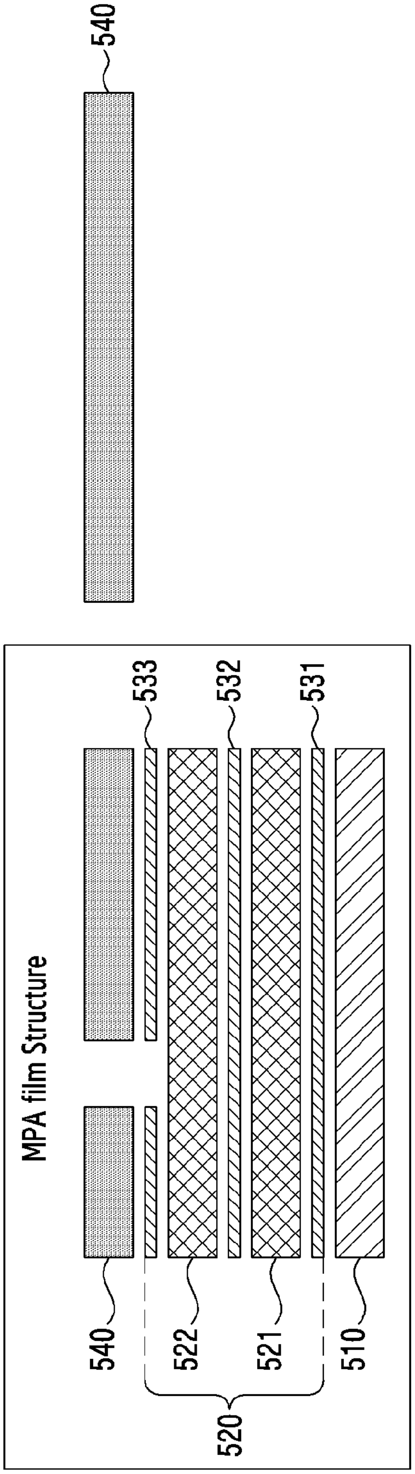
FIG. 5 illustrates an example of a pattern layer in a dielectric film-based stack structure according to embodiments of the disclosure.

FIG. 5 illustrates an example of a pattern layer in a dielectric film-based stack structure according to embodiments of the disclosure. An example, in which two dielectric film layers are stacked, is exemplified therein.

Referring to FIG. 5, a dielectric substrate 520 and a pattern layer 540 may be stacked on a metal plate 510. The metal plate 510 may be a metal substrate for an electrical connection with the RF unit. According to an embodiment, the metal plate 510 may include a conductive material for ground. The dielectric substrate 520 may be disposed on one surface of the metal plate 510. A first surface of the dielectric substrate 520 may be coupled to the metal plate 510 by means of an adhesive material.

The dielectric substrate 520 may include one or more dielectric film layers. For example, the one or more dielectric film layers may include a first dielectric film layer 521 and a second dielectric film layer 522. The dielectric substrate 520 may include one or more adhesive layers. For example, the one or more adhesive layers may include a first adhesive layer 531, a second adhesive layer 532, and a third adhesive layer 533. According to an embodiment, the dielectric film layers may be formed in dielectrics, all of which has the same permittivity. According to another embodiment, the dielectric film layers may include two dielectric film layers formed by dielectrics having different permittivities. The dielectric film, in order to maintain a stable structure of arrangement and a predetermined shape even under heat or pressure, may be stacked using an adhesive material. That is, the dielectric substrate 520 may include a structure by which the first adhesive layer 531, the first dielectric film layer 521, the second adhesive layer 532, the second dielectric film layer 522, and the third adhesive layer 533 are successively stacked from the metal plate 510.

A second surface opposite to the first surface (that is, a surface coupled to the metal plate 510) of the dielectric substrate 520 may be coupled to the pattern layer 540 by means of an adhesive material (e.g., the third adhesive layer 533). A general pattern may be manufactured by forming plating for oxidation prevention on a metal (e.g., a copper sheet). However, a power distribution pattern according to embodiments of the disclosure may be manufactured by a metal having a predetermined thickness or more due to thermal expansion and stiffness. For example, aluminum 3003 series (e.g., A13003 (0.2 T or more)) or stainless steel (sus 304 (0.1 T or more)) may have a changeable thickness according to rigidity of metal. The pattern layer 540 may be formed of only metal without a separate dielectric film layer and an adhesive layer since having a predetermined thickness or more. As the dielectric substrate is used, there may be no necessity of separate oxidation prevention so as to reduce cost. According to an additional embodiment, the entire portion or a partial portion thereof may be made by plating in order for ease of storage. A via hole penetrating a partial region of the pattern layer 540 may be formed, and a structure may be formed by plating along the via hole. The power distribution pattern may be sampled and mass-produced by press punching and laser processing.

Figure 6:
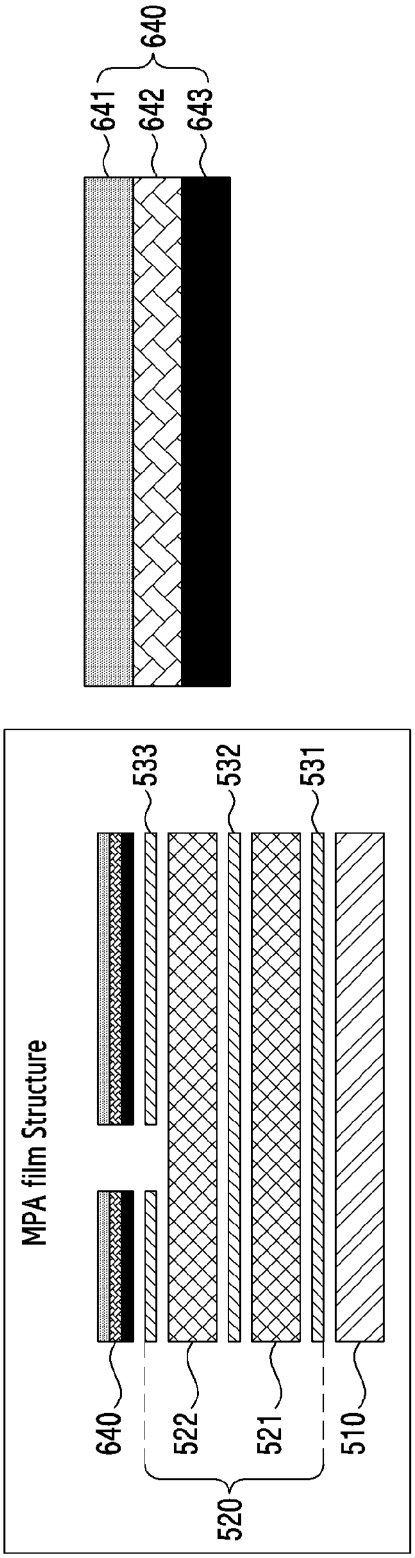
FIG. 6 illustrates another example of a pattern layer in a dielectric film-based stack structure according to embodiment of the disclosure.

FIG. 6 illustrates another example of a pattern layer in a dielectric film-based stack structure according to embodiments of the disclosure.

When a metal has a thickness of 100 μm or less, it may need to increase the thickness thereof in order to implement a stack structure. Except for the description of the pattern layer, the description for the dielectric substrate of FIG. 5 may be, in an identical or a similar manner, applied to other configurations.

Referring to FIG. 6, since a metal for the power distribution pattern does not have a predetermined thickness or more, a separate dielectric film layer and adhesive layer may be additionally required. A power distributor 640 may include a pattern layer 641, and adhesive layer 642, and a film layer 643. The film layer 643, the adhesive layer 642, and the pattern layer 641 may be successively stacked from the dielectric substrate 520. Metal patterns of the pattern layer 641 may be required to be manufactured in a thin sheet type in order to minimize the linewidth thereof and the gap between the lines thereof.

According to an embodiment, the pattern layer 641 may include a copper sheet for oxidation prevention. For example, the pattern layer 641 may have a thickness of −10-30 μm. The adhesive layer 642 and the film layer 643, each of which the rigidity and the thermal expansion coefficient correspond to those of the copper sheet, may be used for implementation of the stack structure. According to an embodiment, the adhesive layer 642 may include an adhesive or a bonding sheet. For example, the adhesive layer 642 may have a thickness o—3-50 μm. According to an embodiment, the film layer 643 may mean a support film for supporting the metal pattern from the dielectric substrate. For example, the film layer 643 may have a thickness of −10-100 μm. The thickness of the pattern may be increased by the stacking of the adhesive layer 642 and the film layer 643 to thus secure rigidity of a pattern element. The pattern may be manufactured through a hot press and a rolling bonding method.

Figure 7A:
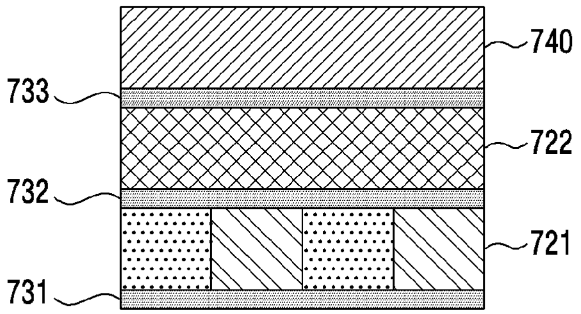
FIGS. 7A and 7B illustrate examples of a dielectric substrate in a dielectric film-based stack structure according to embodiments of the disclosure.
Figure 7B:
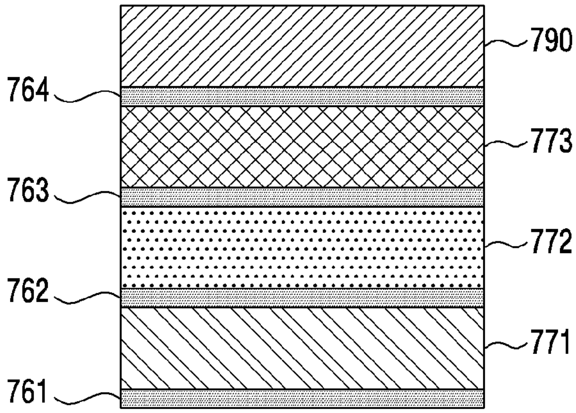

FIGS. 7A and 7B illustrate examples of a dielectric substrate in a dielectric film-based stack structure according to embodiments of the disclosure.

The dielectric substrate may include one or more dielectric film layers. In the dielectric film layer, the arrangement of dielectrics and the arrangement between the dielectric film layers may be changed in various forms.

Referring to FIG. 7A, the dielectric substrate may include a stack structure by which a first adhesive layer 731, a first dielectric film layer 721, a second adhesive layer 732, a second dielectric film layer 722, a third adhesive layer 733, and a pattern layer 740 are successively stacked. One dielectric film layer (e.g., the first dielectric film layer 721) may include different kinds of dielectrics. That is, two or more kinds of dielectric films may be included therein. The dielectric film-based stack structure of the disclosure may include not only a structure in which the adhesive layer and the dielectric film layer consisted of one kind are coupled to each other, but also a structure in which, in one layer, in a state where two or more kinds of dielectric films form one layer, each of the dielectric films and the adhesive layer are connected to each other. The dielectrics, which are positioned in one dielectric film layer, may have a periodic structure. For example, the first dielectric film layer 721 may have different kinds of films, and may be made of a plastic having a periodic structure at the lower end of the pattern. In addition, according to an embodiment, the pattern and length in thickness thereof may be adjusted by not only the stacking of films but also a planar coupling structure.

Although two dielectric film layers are illustrated in FIG. 7A, embodiments of the disclosure may not be limited thereto. It may be understood that a stack structure including one dielectric film layer or a stack structure including three or more dielectric film layers is included in an embodiment of the disclosure as well.

For example, referring to FIG. 7B, the dielectric substrate may include a stack structure by which a first adhesive layer 761, a first dielectric film layer 771, a second adhesive layer 762, a second dielectric film layer 772, a third adhesive layer 763, a third dielectric film layer 773, a fourth adhesive layer 764, and a pattern layer 790 are successively stacked.

Although not illustrated in FIGS. 7A and 7B, according to an embodiment, a metal plate (or a metal sheet) may be attached to the lower end of the dielectric substrate. Ground may not exist in the dielectric substrate, and thus the metal plate may be used as ground. The metal plate may be made of a high conductive material (e.g., silver, copper, or aluminum). The dielectric substrate may be connected to the metal plate through the adhesive layer. The adhesive layer may be bonded thereto by means of an adhesive and a bonding sheet. The dielectric substrate may be coupled to the metal plate. According to an embodiment, the dielectric substrate may be coupled to the metal plate by a screw. In addition, according to an embodiment, the dielectric substrate may be coupled to the metal plate by a plastic rivet. According to an embodiment, the adhesive of the dielectric substrate may include a flame retardant to improve heat resistance and thermal properties.

Figure 8:
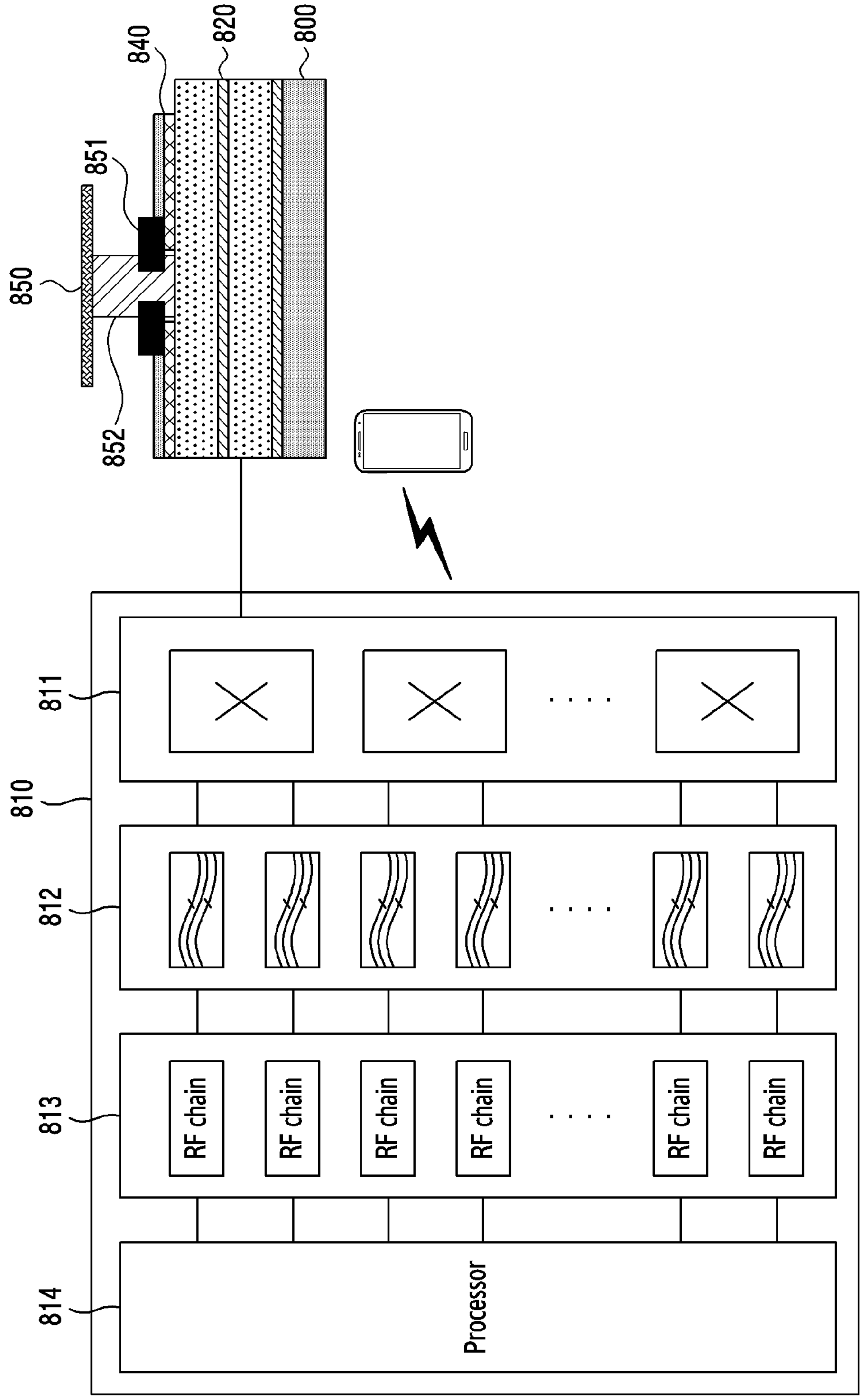
FIG. 8 illustrates a functional configuration of an electronic device including a dielectric film-based stack structure according to an embodiment of the disclosure.

FIG. 8 illustrates a functional configuration of an electronic device including a dielectric film-based stack structure according to embodiments of the disclosure.

An electronic device 810 may be the base station 110 of FIGS. 1A and 1B, or an MMU of the base station 110. Meanwhile, differently from illustrated therein, the disclosure may not exclude that the electronic device 810 is also implemented to the terminal 120 of FIG. 1A. Not only the structure itself of the antenna mentioned through FIGS. 1A and 1B, 2A and 2B, 3, 4A and 4B, 5, 6, 7A and 7B, and 8 but also an electronic device including same, may be included in embodiments of the disclosure. The electronic device 810 may include an antenna element having a gap patch structure in an antenna array.

Referring to FIG. 8, an exemplified functional configuration of the electronic device 810 is illustrated therein. The electronic device 810 may include an antenna part 811, a filter part 812, a radio frequency (RF) processor 813, and a controller 814.

The antenna part 811 may include multiple antennas. The antennas may perform functions for transmitting or receiving a signal through a wireless channel. The antennas may include a conductor formed on a sub-straight (e.g., a PCB) or a radiator including a conductive pattern. The antennas may emit an up-converted signal on a wireless channel, and may obtain a signal emitted from other devices. Each of the antennas may be referred to as an antenna element or an antenna device. In some embodiments, the antenna part 811 may include an antenna array in which multiple antenna elements form an array. The antenna part 811 may be electrically connected to the filter part 812 through RF signal lines. The antenna part 811 may be mounted onto the dielectric substrate including multiple antenna elements. Multiple RF signal lines for feeding each of the antenna elements and connecting an RF element (or RF device) such as the filter part 812, may be arranged on the dielectric substrate. The RF signal lines may be referred to a feeding network. According to an embodiment, a pattern layer for distributing power to each of the antenna elements may be formed on the dielectric substrate.

The antenna part 811 may provide a received signal to the filter part 812, and may emit a signal provided from the filter part 812 into the air. Although the stack structure 400*b* of FIG. 4A, as the dielectric film-based stack structure, is exemplified in FIG. 8, as FIG. 4B, the descriptions described later may, in an identical or a similar manner, be applied a stack structure (e.g., the stack structure 450 of FIG. 4B) including dielectric film layers having different permittivities as well.

As described through FIGS. 3, 4A and 4B, 5, 6, 7A and 7B, the dielectric film-based stack structure may include a metal plate 800, a dielectric substrate 820, and a pattern layer 840 for power distribution. The dielectric substrate 820 may include one or more dielectric film layers and one or more adhesive layers. The adhesive material may bond between the dielectric film layers, between the dielectric film layer and the metal layer, or between the dielectric film layer and a distribution layer, and thus the stack structure may be stable under high temperature or high pressure. According to the divider pattern of the pattern layer formed by punching, other portion of the pattern layer may include an opening. A radiator supporter 852 may be disposed in the region of the opening. The antenna module may include a radiator 850, a feeder 851 for delivering an RF signal to the radiator, and the radiator supporter 852 disposed on the dielectric substrate 820. Each branch of a power distributor of the pattern layer 840 may be connected to the feeder 851. The feeder 851 may provide coupling feeding to the radiator 850. The radiator 850 may be spaced apart from the pattern layer 840 by a predetermined distance or more by means of the radiator supporter 852. Although coupling feeding is exemplified in FIG. 8, differently from illustrated therein, a signal may be delivered to the radiator in direct feeding manner as well.

The filter part 812 may perform filtering in order to deliver a signal of a desired frequency. The filter part 812 may form a resonance to thus perform a function for selectively identifying a frequency. The filter part 812 may include at least one of a band pass filter, a low pass filter, a high pass filter, or a band reject filter. That is, the filter part 812 may include an RF circuit for obtaining a signal of a frequency band for transmission or a signal of a frequency band for reception. The filter part 812 according to various embodiments may electrically connect the antenna part 811 and the RF processor 813.

The RF processor 813 may include multiple RF paths. The RF paths may be a unit of a path through which a signal received through an antenna or a signal emitted through an antenna passes. The at least one RF path may be referred to as an RF chain. The RF chain may include multiple RF elements. The RF elements may include an amplifier, a mixer, an oscillator, a DAC, an ADC, and the like. For example, the RF processor 813 may include an up-converter configured to up-convert a digital transmission signal of a base band to a transmission frequency, and a digital-to-analog converter (DAC) configured to convert the up-converted digital transmission signal to an analog RF transmission signal. The up-converter and the DAC may form a part of a transmission path. The transmission path may further include a power amplifier (PA) or a coupler (or a combiner). In addition, for example, the RF processor 813 may further include an analog-to-digital converter (ADC) configured to convert an analog RF reception signal to a digital reception signal, and a down-converter configured to convert a digital reception signal to a digital reception of a base band. The ADC and the down-converter may form a part of a reception path. The reception path may further include a low-noise amplifier (LNA) or a coupler (or a divider). RF components of the RF processor may be implemented to a PCB. The electronic device 810 may include a structure by which the antenna part 811, the filter part 812, and the RF processor 813 are stacked in the order of the antenna part—the filter part—the RF processor. The antennas, and RF components of the RF processor may be implemented on the PCB, and filters may be repeatedly fastened between a PCB and a PCB to form multiple layers.

The controller 814 may be configured to control an overall operation of the electronic device 810. The controller 814 may include various modules for performing communication. The controller 814 may include at least one processor such as a modem. The controller 814 may include modules for digital signal processing. For example, the controller 814 may include a modem. When transmitting data, the controller 814 may encode and modulate a transmission bit stream to generate complex symbols. In addition, for example, when receiving data, the controller 814 may restore a reception bit stream through demodulating and decoding a baseband signal. The controller 814 may perform functions of a protocol stack required by communication standards.

FIG. 8 illustrates a functional configuration of the electronic device 810 as an apparatus in which the antenna structure of the disclosure can be used. However, the example illustrated in FIG. 8 may be merely an ~~ configuration for using an electronic device having the dielectric film-based stack structure according to embodiments of the disclosure illustrated through FIGS. 1A and 1B, 2A and 2B, 3, 4A and 4B, 5, 6, 7A and 7B, and embodiments of the disclosure may not be limited to elements of the apparatus illustrated FIG. 8. Therefore, it may be understood that an antenna module including a stack structure, communication equipment of other configurations, and an antenna structure itself are also included in an embodiment of the disclosure.

In the above described embodiments, as an example of the radiator, a radiation patch has been exemplarily described. However, the radiation patch antenna may be merely an embodiment, and other radiation structure having the same technical concept may be used instead of same. In addition, in the disclosure, as an example of the arrangement of the radiator, a structure, in which the radiator is mounted to face the outside through the support, has been described. However, in connection with an embodiment of the disclosure, it may be understood that not only the configuration of directly transmitting a signal through the radiator on the support but also the configuration, such as an antenna radome, in which a signal is emitted or relayed through a pattern formed on an outer cover, are included in an implementation of the radiator of the disclosure.

In the above described embodiments, the stack structure of the antenna module, in which the feeder, the radiator supporter, and the radiator are mounted on the divider pattern formed by punching, has been described as an example. However, embodiments of the disclosure may not be limited thereto. In order for simplification in view of manufacturing the radiator support including a dielectric, it may be understood that the configuration in which the dielectric film layer positioned at the uppermost top of the dielectric substrate functions as a supporter together therewith, is included in another embodiment of the disclosure.

An antenna module according to embodiments of the disclosure may include: multiple antennas; a distribution circuit disposed to provide an electrical connection with each of the multiple antennas; a metal plate; a dielectric substrate disposed between a pattern layer of the distribution circuit and the metal plate, wherein the dielectric substrate may include one or more dielectric film layers and one or more adhesive layers.

According to an embodiment, the one or more dielectric film layers may include a first dielectric film layer and a second dielectric film layer, and the one or more adhesive layers may include a first adhesive layer formed between the metal plate and the first dielectric film layer and a second adhesive layer formed between the first dielectric film layer and the second dielectric film layer.

According to an embodiment, the dielectric substrate may include an adhesive layer configured to attach the distribution circuit thereto.

According to an embodiment, the distribution circuit may include a metal region formed on the pattern layer by punching.

According to an embodiment, the pattern layer may include a metal layer on which the distribution circuit is formed, an adhesive layer, and a support film layer, and the support film layer, the adhesive layer, and the metal layer may be successively stacked from the dielectric substrate.

According to an embodiment, the antenna module may further include a feeder connected to each branch of the distribution circuit, and the feeder may be disposed to be spaced apart from a patch of a corresponding antenna by a predetermined interval in order for coupling feeding, or may be connected to the corresponding antenna in order for direct feeding.

According to an embodiment, the one or more dielectric film layers may include a first dielectric film layer having a first permittivity and a second dielectric film layer having a second permittivity, and the first permittivity may differ from the second permittivity.

According to an embodiment, the one or more dielectric film layers may include a heterogeneous film layer, and the heterogeneous film layer may have different types of dielectrics arranged in a periodic structure on one layer.

According to an embodiment, the total permittivity of the dielectric substrate may be configured to have a permittivity with an error range of 5% in 2 to 6 [F (farad)/m (meter)], and each of the one or more dielectric film layers may be configured to have a thickness with an error range of 5% in 100 micrometer ((m) or less.

According to an embodiment, the dielectric substrate may be coupled to the metal plate by a screw or a plastic rivet.

According to an embodiment, the pattern layer comprises a copper sheet configured to prevent oxidation.

According to an embodiment, the pattern layer has a thickness of 10 to 30 micrometer ((m).

According to an embodiment, the adhesive layer and the support film layer each have a rigidity and a thermal expansion coefficient that corresponds to those of the copper sheet.

A massive multiple-input multiple-output (MIMO) unit (MMU) device according to embodiments of the disclosure may include: at least one processor; a power supply; a metal plate; and antenna module, and the antenna module may include: a distribution circuit which includes a sub-array of an antenna array and is disposed to provide an electrical connection with each of multiple antenna elements of the sub-array; and a dielectric substrate disposed between a pattern layer of the distribution circuit and the metal plate, wherein the dielectric substrate may include one or more dielectric film layers and one or more adhesive layers.

According to an embodiment, the one or more dielectric film layers may include a first dielectric film layer and a second dielectric film layer, and the one or more adhesive layers may include a first adhesive layer formed between the metal plate and the first dielectric film layer and a second adhesive layer formed between the first dielectric film layer and the second dielectric film layer.

According to an embodiment, the dielectric substrate may include an adhesive layer configured to attach the distribution circuit thereto.

According to an embodiment, the distribution circuit may include a metal region formed on the pattern layer by punching.

According to an embodiment, the pattern layer may include a metal layer on which the distribution circuit is formed, an adhesive layer, and a support film layer, and the support film layer, the adhesive layer, and the metal layer may be successively stacked from the dielectric substrate.

According to an embodiment, the antenna may further include a feeder connected to each branch of the distribution circuit, and the feeder may be disposed to be spaced apart from a patch of a corresponding antenna element by a predetermined interval in order for coupling feeding, or may be connected to the corresponding antenna element in order for direct feeding.

According to an embodiment, the one or more dielectric film layers may include a first dielectric film layer having a first permittivity and a second dielectric film layer having a second permittivity, and the first permittivity may differ from the second permittivity.

According to an embodiment, the one or more dielectric film layers may include a heterogeneous film layer, and the heterogeneous film layer may have different types of dielectrics arranged in a periodic structure on one layer.

According to an embodiment, the total permittivity of the dielectric substrate may be configured to have a permittivity with an error range of 5% in 2 to 6 [F(farad)/m (meter)], and each of the one or more dielectric film layers may be configured to have a thickness with an error range of 5% in 100 micrometer ((m) or less.

According to an embodiment, the dielectric substrate may be coupled to the metal plate by a screw or a plastic rivet.

According to an embodiment, the pattern layer comprises a copper sheet configured to prevent oxidation.

According to an embodiment, the pattern layer has a thickness of 10 to 30 micrometer ((m).

According to an embodiment, the adhesive layer and the support film layer each have a rigidity and a thermal expansion coefficient that corresponds to those of the copper sheet.

The disclosure may relate to a method for manufacturing an MMU antenna through stacking of a dielectric film such as a plastic, instead of manufacturing an MMU antenna using a PCB. An antenna module may be designed through a dielectric film and antenna dipole, and parts of a metal plate, to thus further simplify an antenna assembly method. In addition, a substrate may be formed using a dielectric instead of manufacturing an expensive PCB, to thus reduce unit cost and lighten weight due to nonuse of subsidiary materials. In addition, the dielectric substrate may be designed to have a thin thickness by using the dielectric film layer to thus promote performance improvement due to low dielectric loss.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An antenna module comprising:

a dielectric substrate including a first dielectric layer and a second dielectric layer disposed on the first dielectric layer;

a metal plate coupled to the first dielectric layer;

a film structure including a film layer coupled to a face of the second dielectric layer, an adhesive layer disposed on the film layer, and a pattern layer disposed on the adhesive layer, wherein openings are formed in the film structure;

a plurality of antennas; and a plurality of support members for supporting the plurality of antennas, wherein the plurality of support members are disposed in the openings and disposed on the face of the second dielectric layer, and wherein the pattern layer of the film structure is configured to supply power to the plurality of antennas.

2. The antenna module of claim 1, further comprising:

a first adhesive layer disposed between the metal plate and the first dielectric layer; and a second adhesive layer disposed between the first dielectric layer and the second dielectric layer.

3. The antenna module of claim 1, wherein the film layer, the adhesive layer, and the pattern layer are stacked in order from the dielectric substrate.

4. The antenna module of claim 1, further comprising:

a feeding line connected to a metal pattern of the pattern layer, wherein the feeding line is disposed to be spaced apart from an antenna among the plurality of antennas by a predetermined interval for a coupling feeding.

5. The antenna module of claim 1, wherein the first dielectric layer has a first permittivity and the second dielectric layer has a second permittivity, and wherein the first permittivity is different from the second permittivity.

6. The antenna module of claim 1, wherein a type of a dielectric of the first dielectric layer is different from a type of a dielectric of the second dielectric layer.

7. The antenna module of claim 1, wherein a total permittivity of the dielectric substrate is configured to have a permittivity with an error range of 5% in 2 to 6 farad/meter, and wherein each of the first dielectric layer and the second dielectric layer is configured to have a thickness with an error range of 5% in 100 micrometer or less.

8. The antenna module of claim 1, wherein the dielectric substrate is coupled to the metal plate by a screw or a plastic rivet.

9. The antenna module of claim 1, wherein the pattern layer includes a metal pattern for supplying the power.

10. A massive multiple-input multiple-output (MIMO) unit (MMU) device comprising:

at least one processor; and an antenna module, wherein the antenna module comprises:

a dielectric substrate including a first dielectric layer and a second dielectric layer disposed on the first dielectric layer, a metal plate coupled to the first dielectric layer, a film structure including a film layer coupled to a face of the second dielectric layer, an adhesive layer disposed on the film layer, and a pattern layer disposed on the adhesive layer, wherein openings are formed in the film structure, a plurality of antennas, and a plurality of support members for supporting the plurality of antennas, wherein the plurality of support members are disposed in the openings and disposed on the face of the second dielectric layer, and wherein the pattern layer of the film structure is configured to supply power to the plurality of antennas.

11. The MMU device of claim 10, further comprising:

a first adhesive layer disposed between the metal plate and the first dielectric layer, and a second adhesive layer disposed between the first dielectric layer and the second dielectric layer.

12. The MMU device of claim 10, wherein the film layer, the adhesive layer, and the pattern layer are stacked in order from the dielectric substrate.

13. The MMU device of claim 10, wherein the antenna module further comprises a feeding line connected to a metal pattern of the pattern layer, and wherein the feeding line is disposed to be spaced apart from an antenna among the plurality of antennas by a predetermined interval for a coupling feeding.

14. The MMU device of claim 10, wherein the first dielectric layer has a first permittivity and the second dielectric layer has a second permittivity, and wherein the first permittivity is different from the second permittivity.

15. The MMU device of claim 10, wherein a type of a dielectric of the first dielectric layer is different from a type of a dielectric of the second dielectric layer.

16. The MMU device of claim 10, wherein a total permittivity of the dielectric substrate is configured to have a permittivity with an error range of 5% in 2 to 6 farad/meter, and wherein each of the first dielectric layer and the second dielectric layer is configured to have a thickness with an error range of 5% in 100 micrometer or less.

17. The MMU device of claim 10, wherein the dielectric substrate is coupled to the metal plate by a screw or a plastic rivet.

18. The MMU device of claim 10, wherein the pattern layer includes a metal pattern for supplying the power.

* * * * *